United States Patent
Yoon et al.

(10) Patent No.: US 8,588,512 B2
(45) Date of Patent: Nov. 19, 2013

(54) LOCALIZATION METHOD FOR A MOVING ROBOT

(75) Inventors: Sukjune Yoon, Seoul (KR); Woosup Han, Yongin-si (KR); Seung Ki Min, Suwon-si (KR); Kyung Shik Roh, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1168 days.

(21) Appl. No.: 12/010,088

(22) Filed: Jan. 18, 2008

(65) Prior Publication Data

US 2008/0232678 A1 Sep. 25, 2008

(30) Foreign Application Priority Data

Mar. 20, 2007 (KR) .................. 10-2007-0027068

(51) Int. Cl.
*G06K 9/00* (2006.01)
*G06F 19/00* (2011.01)

(52) U.S. Cl.
USPC .......................................... 382/153; 700/245

(58) Field of Classification Search
USPC ................................ 382/153; 700/245; 901/1
See application file for complete search history.

(56) References Cited

U.S. PATENT DOCUMENTS

| | | | |
|---|---|---|---|
| 5,961,571 A * | 10/1999 | Gorr et al. ..................... | 701/207 |
| 7,228,230 B2 * | 6/2007 | Hirokawa ..................... | 701/472 |
| 2006/0075422 A1 * | 4/2006 | Choi et al. ..................... | 725/18 |
| 2006/0177101 A1 * | 8/2006 | Kato et al. ..................... | 382/106 |
| 2010/0222925 A1 * | 9/2010 | Anezaki ....................... | 700/253 |

FOREIGN PATENT DOCUMENTS

| | | |
|---|---|---|
| JP | 10-160463 | 6/1998 |
| JP | 2002-296010 | 10/2002 |
| JP | 2004-042148 | 2/2004 |
| JP | 2004-133567 | 4/2004 |
| JP | 2005-315746 | 11/2005 |
| JP | 2006-004175 | 1/2006 |

OTHER PUBLICATIONS

Kazuyuki Kobayashi, Miwako Amemiya, Kajiro Watanabe,"Absolute speed estimation from sequential frames of omni-directional image", SICE Annual Conference in Fukui, Aug. 4-6, 2003.*
K. Briechle et al. (hereinafter Briechle, Self-Localization of a Mobile Robot using Fast Normalized Cross Correlation, IEEE, 1999).*
Japanese Office Action for corresponding Japanese Application 2008-003868.

* cited by examiner

*Primary Examiner* — David Zarka
*Assistant Examiner* — Ha Le
(74) *Attorney, Agent, or Firm* — Staas & Halsey LLP

(57) ABSTRACT

A localization method of a moving robot is disclosed in which the moving robot includes: capturing a first omni-directional image by the moving robot; confirming at least one node at which a second omni-directional image having a high correlation with the first omni-directional image is captured; and determining that the moving robot is located at the first node when the moving robot reaches a first node, at which a second omni-directional image having a highest correlation with the first omni-directional image is captured, from among the at least one node.

19 Claims, 8 Drawing Sheets

LOCALIZATION METHOD FOR A MOVING ROBOT

CROSS-REFERENCE TO RELATED APPLICATIONS

This application claims the benefit of Korean Patent Application No. 2007-0027068, filed on Mar. 20, 2007 in the Korean Intellectual Property Office, the disclosure of which is incorporated herein by reference.

BACKGROUND

1. Field

The present invention relates to a method of determining a location of a robot (i.e., a localization method for the robot), and more particularly to a localization method of the moving robot to correctly recognize the location of a moving robot using an omni-directional image.

2. Description of the Related Art

Generally, an omni-directional camera is adapted to acquire an omni-directional image (i.e., an image of 360° in the vicinity of the camera). In recent times, a localization method of the moving robot has been introduced to the market. In the case of the localization method, the omni-directional camera has been mounted to the moving robot so that the localization of the robot is performed using the omni-directional image captured by the omni-directional camera.

A representative example of the above-mentioned omni-directional camera mounted to the omni-directional robot to recognize the location of the robot has been disclosed in Japanese Patent Laid-open No. 10-160463, which is hereby incorporated by reference. According to the above-mentioned Japanese Patent Laid-open No. 10-160463, an omni-directional vision sensor including an omni-directional visual view to a moving object allows the moving object to move along a specific path, and at the same time the omni-directional vision sensor acquires the images in the vicinity of the moving object using a time-series standard pattern. If a moving object moves along a predetermined path, the acquisition image of the omni-directional vision sensor is compared with the image based on the standard pattern. If the acquisition image of the omni-directional vision sensor is equal to the above-mentioned standard pattern image, the location associated with the standard pattern image is recognized as the detection result.

However, the above-mentioned conventional localization method of the moving object estimates only the approximate location of the moving object, instead of the correct location of the moving object, so that it has difficulty in localization of the moving object, Also, the conventional localization method of the moving object uses the dynamic programming algorithm as the matching algorithm. This dynamic programming algorithm is very sensitive to errors, so that the localization accuracy is greatly deteriorated.

SUMMARY

Therefore, it is an aspect of the embodiment to provide a localization method of a moving robot to correctly detect the location of the moving robot.

Additional aspects and/or advantages will be set forth in part in the description which follows and, in part, will be obvious from the description, or may be learned by practice of the invention.

In accordance with the embodiment, the above and/or other aspects can be achieved by the provision of a localization method of a moving robot including: capturing a first omni-directional image by the moving robot; confirming at least one node at which a second omni-directional image having a high correlation with the first omni-directional image is captured; and determining that the moving robot is located at the first node when the moving robot reaches a first node, at which a second omni-directional image having a highest correlation with the first omni-directional image is captured, from among the at least one node.

The method further includes: determining that the moving robot reaches the first node when a correlation coefficient between the second omni-directional image of the first node and the first captured omni-directional image is higher than a reference value.

The method further includes: determining that the moving robot reaches the first node when the current first node is not changed from a previous first node and the correlation coefficient between the second omni-directional image of the first node and the first captured omni-directional image gradually increases and then decreases.

The method further includes: moving the moving robot to continuously move to the first node when the correlation coefficient between the second omni-directional image of the first node and the first captured omni-directional image gradually increases and then does not decrease.

The method further includes: moving the moving robot to move to a new first node when the first node is changed from a previous first node.

Preferably, the method further includes: determining, by the moving robot, whether the remaining nodes other than the first node from among the at least one node are effective or not when the moving robot moves to the first node, where the moving direction of the moving robot is maintained when the number of effective nodes is set to "0", the moving robot moves from the effective node to the first node when the number of effective nodes is set to "1", and the moving robot moves from a gravity center of a triangle composed of the first node and two effective nodes to the first node when the number of effective nodes is set to "2".

Each of the correlations is indicative of a correlation between current lines of two omni-directional images.

Each of the correlations is represented by a correlation coefficient, and the correlation coefficient may be calculated by the following equation:

$$\rho(\tau) = \frac{C_{xy}(\tau)}{\sqrt{C_{xx}(0) \cdot C_{yy}(0)}} \quad \text{[Equation]}$$

where $\rho(\tau)$ is indicative of a correlation coefficient, $\tau$ is indicative of a rotation angle, $C_{xy}$ is indicative of a cross-correlation value, and $C_{xx}$ and $C_{yy}$ are indicative of auto-correlation values.

The cross-correlation value may be calculated by a Fast Fourier Transform (FFT).

The foregoing and/or other aspects are achieved by providing a localization method of a moving robot including: capturing a first omni-directional image by the moving robot; confirming at least one node at which a second omni-directional image having a high correlation with the first omni-directional image is captured; and determining that the moving robot is located at the first node when the moving robot reaches a first node, at which a second omni-direction image having a highest correlation with the first captured omni-directional image is captured, and moving the moving robot to move to the first node when the moving robot does not reach the first node.

The method further includes: determining whether the remaining nodes other than the first node from among the at least one node are effective or not, and moving the moving robot to move to a heading angle determined according to the number of effective nodes, so that the moving robot approaches the first node.

The number of the at least one node may be "3", the moving direction of the moving robot may be set to the heading angle when the number of effective nodes is "0", the direction from the effective node to the first node is set to the heading angle when the number of effective nodes is "1", and the direction from a gravity center of a triangle composed of the first node and two effective nodes to the first node is set to the heading angle when the number of effective nodes is "2".

Each of the correlations is indicative of a correlation between current lines of two omni-directional images.

Each of the correlations is represented by a correlation coefficient, and the correlation coefficient may be calculated by the following equation:

$$\rho(\tau) = \frac{C_{xy}(\tau)}{\sqrt{C_{xx}(0) \cdot C_{yy}(0)}}$$ [Equation]

where $\rho(\tau)$ is indicative of a correlation coefficient, $\tau$ is indicative of a rotation angle, $C_{xy}$ is indicative of a cross-correlation value, and $C_{xx}$ and $C_{yy}$ are indicative of auto-correlation values.

The cross-correlation value may be calculated by a Fast Fourier Transform (FFT).

The nodes may be determined to be effective when the remaining nodes other than the first node are within an effective range of the first node.

The foregoing and/or other aspects are achieved by providing a moving robot, including: an omni-directional camera capturing an omni-directional image by the moving robot; a correlation coefficient calculator calculating a correlation coefficient between the captured omni-directional image and at least a second omni-directional image captured at least at one node location of a movable place of the moving robot, the at least one node location being the node location having the highest correlation coefficient from among a plurality of node locations; and a controller moving the moving robot to the first node location when the correlation coefficient calculator calculates that the correlation coefficient is not greater than a reference value and the current first node location is not equal to a previous first node location and determining that the moving robot is at the first node location when the correlation coefficient is greater than the reference value.

The controller moves the moving robot to the first node location when the current first node location is not equal to a previous first node location.

The controller determines that the moving robot is at the first node location when the correlation coefficient is not greater than the reference value, the current first node location is equal to the previous first node location, and the correlation coefficient of the current first node location is less than a correlation coefficient of the previous first node location, the correlation coefficient of the previous first node location being greater than correlation coefficients of other first node locations prior to the previous first node location.

The controller moves the moving robot to the first node location when the correlation coefficient is not greater than the reference value, the current first node location is equal to the previous first node location, and the correlation coefficient of the current first node location is not less than a correlation coefficient of the previous first node location.

BRIEF DESCRIPTION OF THE DRAWINGS

These and/or other aspects and advantages will become apparent and more readily appreciated from the following description of the embodiment, taken in conjunction with the accompanying drawings of which.

DETAILED DESCRIPTION OF THE EMBODIMENTS

Figure 1:
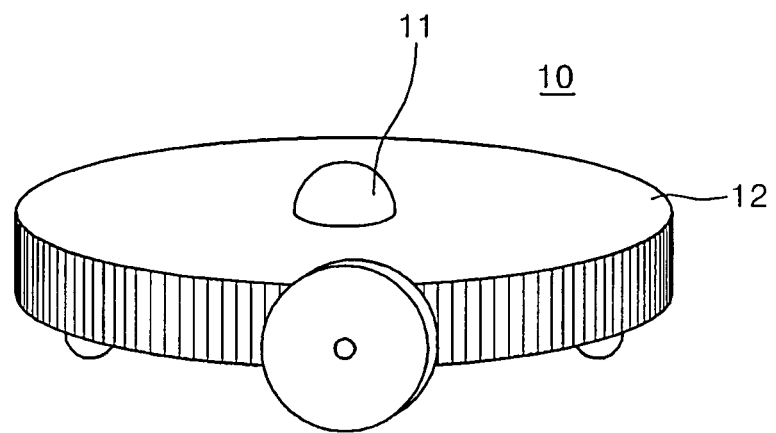
FIG. 1 shows the appearance of a moving robot according to the present embodiment.

Reference will now be made in detail to the embodiment, examples of which are illustrated in the accompanying drawings, wherein like reference numerals refer to like elements throughout. The embodiment is described below to explain the present invention by referring to the figures.

Referring to FIG. 1, the moving robot 10 according to the present embodiment includes a robot body 12 and an omni-directional camera 11 mounted to the robot body 12. The omni-directional camera 11 includes an omni-directional lens 11a and a CCD element 11b as shown in FIG. 2.

Figure 2:
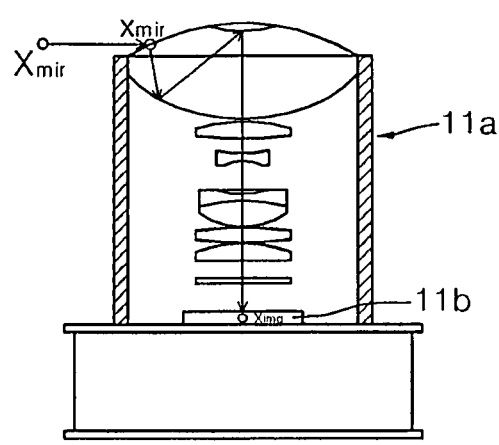
FIG. 2 is a structural diagram illustrating a cross-sectional view captured by the omni-directional camera shown in FIG. 1 according to the present embodiment.

Referring to FIG. 2, a curved mirror is attached to a front part of the omni-directional camera 11, such that an image of 360° in the vicinity of the omni-directional camera is acquired. In more detail, a spatial point Xmir is reflected at a specific point Xmir located on the curved mirror, such that an image is formed on the CCD element 11b, resulting in the occurrence of a point Xing on the final image. The point Xmir is distributed in the omni-direction, so that the omni-directional camera can capture the image of 360° in the vicinity of the camera.

Figure 4:
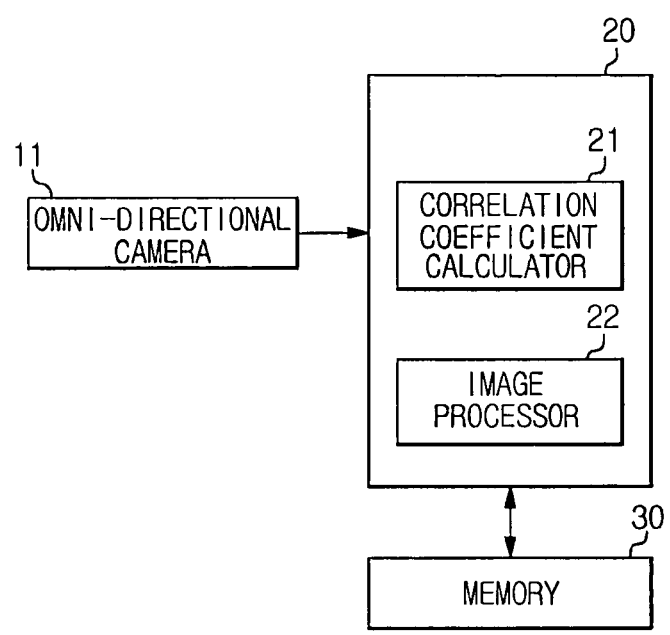
FIG. 4 is a block diagram illustrating a moving robot according to the present embodiment.

Referring to FIG. 4, the moving robot 10 including the constituent elements shown in FIG. 1 or 2 further includes a memory 30 to store node data and a controller 20 to control the moving robot 10.

Figure 5:
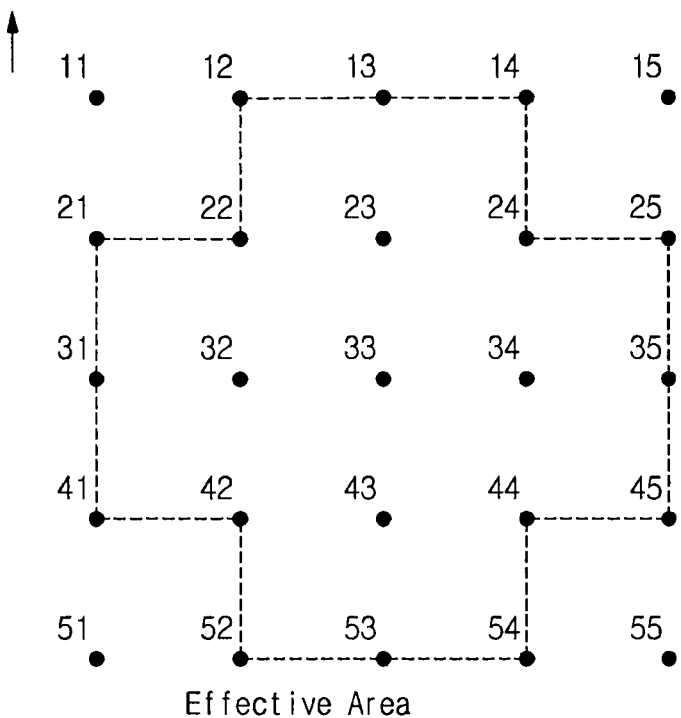
FIG. 5 exemplarily shows nodes of the space in which the moving robot is movable.
Figure 6:
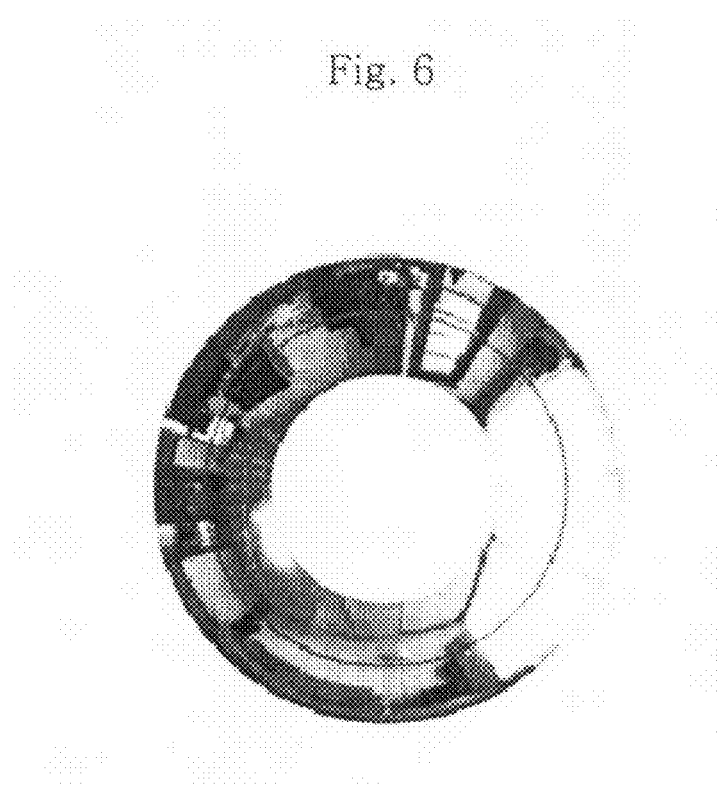
FIG. 6 exemplarily shows a current line of the omni-directional image of FIG. 3.

As shown in FIG. 5, node data includes a node map indicating individual node locations of the movable place of the robot, an omni-directional image of a corresponding node, and a current line of the omni-directional image. Each node location of the node map is stored as coordinate values. The omni-directional image of each node is acquired by the omni-directional camera 11 capable of capturing the image from the robot 10 at individual nodes. In this case, in the case of capturing the omni-directional image at each node, it is preferable that the omni-directional camera 11 may be arranged to face the same capture direction. As shown in FIG. 6, the current line indicates a plane parallel to the surface (or bottom) of the omni-directional image.

Figure 3:
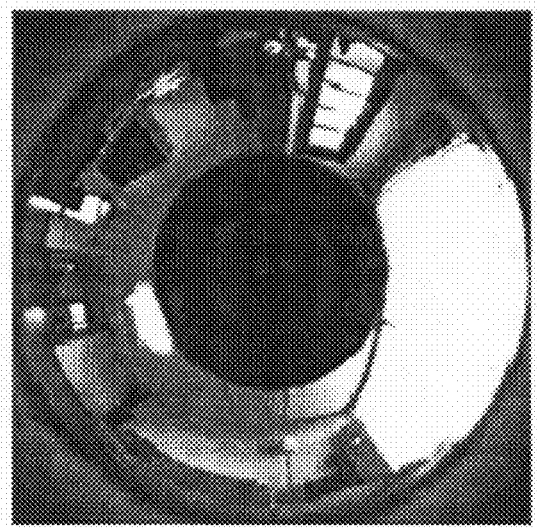
FIG. 3 exemplarily shows an omni-directional image captured by the omni-directional camera shown in FIG. 1 according to the present embodiment.

The controller includes an image processor 22 and a correlation coefficient calculator 21. The image processor 22 performs pre-processing of the omni-directional image captured by the omni-directional camera 11. The meaningless part of the omni-directional image of FIG. 3 is cut off, and a histogram equalization is executed on a donut-shaped circle to perform image-processing.

If the image processing is completed by the image processor 22, the controller 20 extracts the above-mentioned current line. In this case, the current line is established at the origin of the omni-directional image, and the resolution of the current line may be calculated by the square of 2 (i.e., by the image processor 22) in consideration of characteristics of the Fast Fourier Transform (FFT) to calculate the correlation coefficient.

The correlation coefficient calculator 21 calculates the correlation coefficient between a first current line of the omni-directional image captured at the robot 10 and a second current line acquired from individual nodes, as represented by the following equation:

$$\rho(\tau) = \frac{C_{xy}(\tau)}{\sqrt{C_{xx}(0) \cdot C_{xy}(0)}}$$

where $\rho(\tau)$ is a correlation coefficient, $\tau$ is a rotation angle, $C_{xy}$ is a cross-correlation value, and $C_{xx}$ is an auto-correlation value.

In the above Equation, the highest correlation coefficient is set to "1". The closer the absolute value of the correlation coefficient is to "1", the higher the similarity between the current lines of omni-directional images compared with each other. And, $C_{xx}$ is calculated by the FFT.

The Fourier Transform transforms numerical sequences contained between a frequency domain and a time domain, selects a series of time samples using the numerical calculation based on the Fourier Transform scheme, measures frequency components of the selected time samples, and calculates how much energy will occur in the time-sample sequence using a variety of frequencies. Provided that the above-mentioned Fourier Transform scheme is performed at high speed, the Fast Fourier Transform scheme is implemented. Although the Fourier Transform scheme can also calculate a resolution sequence having a specific length, the resolution of the current line must be set to the square of 2 in order to maximize FFT advantages.

Figure 7:
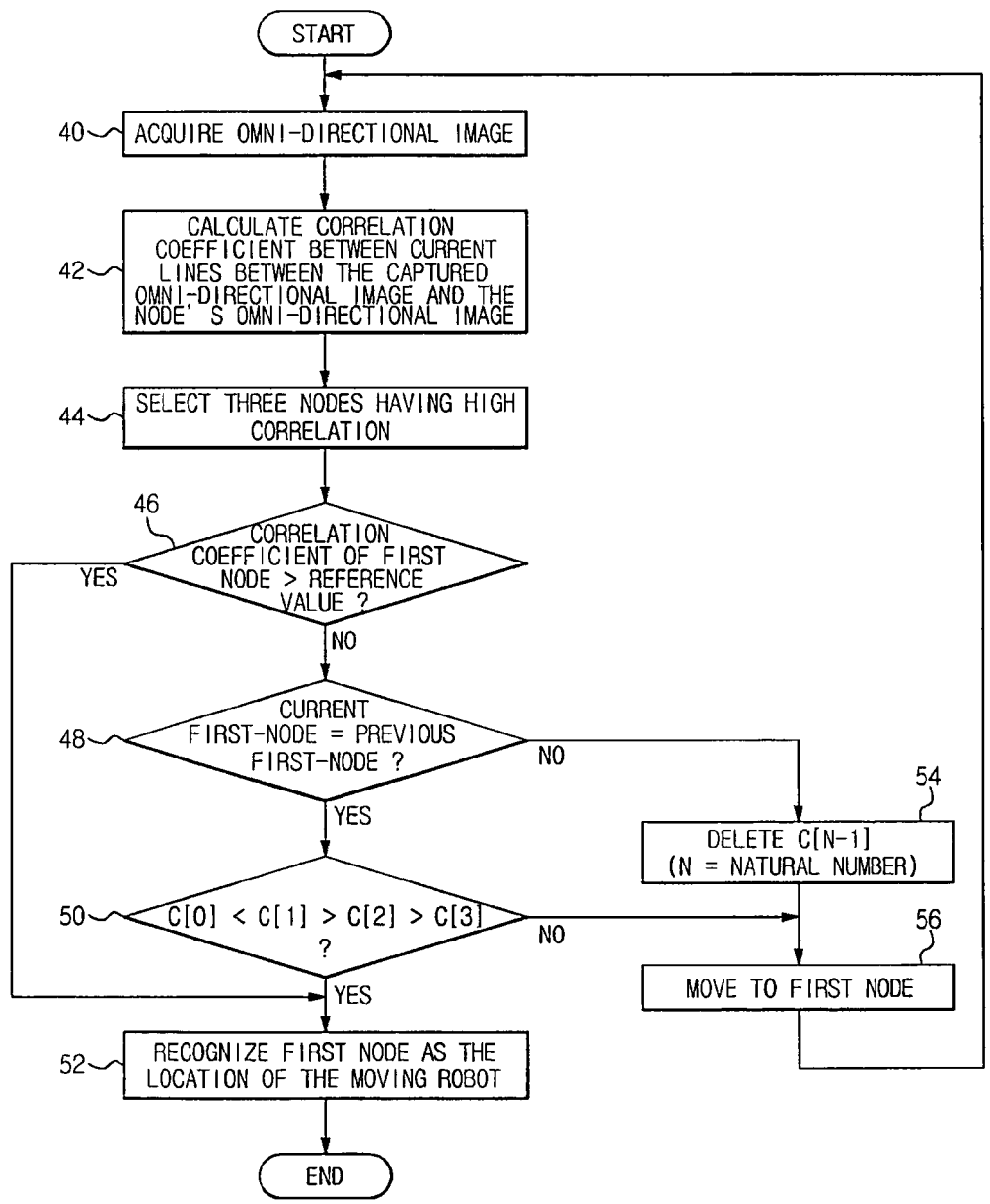
FIG. 7 is a flow chart illustrating a robot localization method according to the present embodiment.

A method of recognizing the location of a moving robot (i.e., a robot localization method) will hereinafter be described with reference to FIGS. 7 and 8. If the moving robot 10 is located at a predetermined spatial point, the omni-directional camera 11 of the moving robot 10 captures the omni-directional image at operation 40. The captured omni-directional image is transmitted to the correlation coefficient calculator 21 via the image processor 22. The correlation coefficient calculator 21 calculates the correlation coefficient between the current line of the omni-directional image and the other current line of the omni-directional image captured at each node at operation 42.

If the correlation coefficient calculation of each node is calculated, the controller 20 selects three nodes having a high correlation (i.e., the absolute value of the correlation coefficient is high) with the captured omni-directional image at operation 44. Next, the controller 20 determines a specific node having the highest correlation coefficient from among the three nodes to be the first node, and determines whether the correlation coefficient of the first node is higher than a reference value at operation 46. In this case, the reference value may be selected in consideration of the specification of the omni-directional camera 11 and may be set to any value close to the value of 1.

If the correlation coefficient of the first node is higher than the reference value, the controller 20 determines that there is a high correlation in current lines between the omni-directional image of the moving robot 10 and the other omni-directional image of the first node, so that the controller 20 determines that the moving robot 10 is located at the first node at operation 52.

If the correlation coefficient of the first node is equal to or less than the reference value, the controller 20 determines whether a current first node is equal to a previous first node at operation 48. This operation is adapted to determine whether the moving robot continuously moves in the vicinity of a specific node although the robot is not located at the same node as the specific node.

If the current first node is equal to the previous first node at operation 48, the controller 20 determines whether a correlation coefficient (C[0]) of the current first node is less than a correlation coefficient (C[1]) of the previous first node, the correlation coefficient (C[1]) of the previous first node is higher than a correlation coefficient (C[2]) of a previous first node arranged before the previous first node, and the correlation coefficient (C[2]) of the previous first node before the previous first node is higher than a correlation coefficient (C[3]) of another previous first node before the C[2]'s node, at operation 50. In this case, C[n−1] (where n=natural number) is a first-node's correlation coefficient which is currently calculated or has been pre-calculated and is stored in the memory 30 until it is deleted at operation 54.

If the above-mentioned conditions are satisfied, the controller 20 determines that the moving robot 10 gradually approaches the first node and becomes more distant from the first node, so that it is determined that the moving robot 10 is located at the first node at operation 52. However, if the above-mentioned conditions are not satisfied because the number of C[n−1] (where n=natural number) stored in the memory 30 is less than "4" or C[n−1] continuously increases, the controller 20 determines that the moving robot 10 does not reach the first node, and continuously moves the moving robot to the first node at operation 56.

In the meantime, if the current first node is different from the previous first node at operation 48, the controller determines that the moving robot 10 moves to the current first node instead of the previous first node, and deletes C[n−1] (where n=natural number) from the memory 30 to determine whether the moving robot 10 approaches the previous first node at operation 54. The moving robot 10 moves to a new first node at operation 56.

Figure 8:
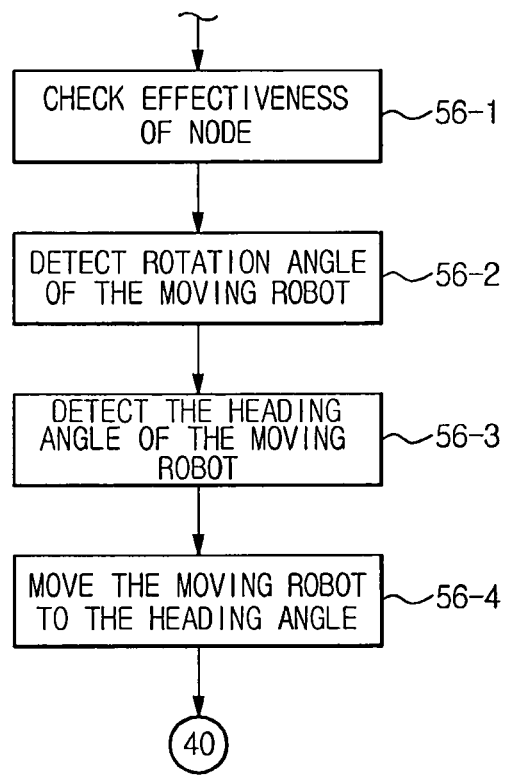
FIG. 8 is a flow chart illustrating operations in moving the moving robot to a first node according to the present embodiment.

As shown in FIG. 8, in order to move to the first node, the moving robot 10 determines whether the two remaining nodes other than the first node selected from the aforementioned three nodes are effective at operation 56-1. The effective conditions may be established in various ways. However, according to the present embodiment, if a target node is any one of at least three nodes on the basis of the first node, it is determined that the target node is effective. For example, if the "33"-node of FIG. 5 is the first node, the effective range corresponds to a dotted-lined range. If the two remaining nodes having high correlation coefficients are the "41"-node and the "42"-node, the "41"-node and the "42"-node are contained in the effective range, so that the above-mentioned two nodes are determined to be effective nodes.

If the effectiveness test of the node is completed, the rotation angle of the moving robot 10 is detected at operation 56-2. The rotation angle of the moving robot 10 is an angle between a capture direction (e.g., a direction from a lower part to an upper part of FIG. 5) and a traveling direction of the moving robot 10. Next, a heading angle of the moving robot is determined at operation 56-3. The heading angle of the moving robot 10 is indicative of an angle between the traveling direction of the moving robot 10 and the capture direction, so that the moving robot 10 can approach the first node by the heading angle.

The heading angle of the moving robot 10 is determined in different ways according to the number of effective nodes. In other words, if all of the two remaining nodes other than the first node from among the three nodes selected at operation 44 are not effective, the established traveling direction of the moving robot is set to the heading angle. If only one node from among the two remaining nodes is effective, it is determined that the moving robot 10 is located between the first node and the effective node, and the heading angle of the moving robot 10 is established in the first-node direction instead of the effective-node direction such that the moving robot 10 can move along the first-node direction.

Finally, if the two remaining nodes are all effective, the controller 20 determines that the moving robot 10 is located in a triangle composed of the first node and the two effective nodes. In order to allow the moving robot 10 to approach the first node, a specific direction from the gravity center of the triangle to the first node is determined to be the heading angle of the moving robot 10.

If the heading angle of the moving robot 10 is extracted, the controller 20 allows the traveling direction of the moving robot 10 to change from the rotation angle to the heading angle, so that the moving robot 10 moves at operation 56-4. And, the above-mentioned process returns to operation 40, and re-performs the cycle of FIG. 7.

As is apparent from the above description, if the moving robot does not reach a specific node, the robot localization method according to the present embodiment continuously moves the moving robot to the specific node. The robot localization method determines that the moving robot is located at the specific node only when it is determined that the moving robot has reached the specific node, so that the location of the moving robot can be correctly recognized.

The present embodiment determines whether the specific node is effective or not while the moving robot approaches the specific node, and amends the heading angle of the moving robot several times until the moving robot reaches the specific node, so that the moving robot can recognize the correct location of the moving robot.

The present embodiment can correctly recognize the location of the moving robot although there is no previous location data of the moving robot, so that it can be effectively used to recognize the initial location of the robot, and can solve the kidnap problem by which the location of the moving robot is suddenly changed.

Although an embodiment has been shown and described, it would be appreciated by those skilled in the art that changes may be made in these embodiments without departing from the principles and spirit of the invention, the scope of which is defined in the claims and their equivalents.

What is claimed is:

1. A localization method of a moving robot, the method comprising:
    capturing a first omni-directional image by the moving robot;
    confirming at least one node at which a second omni-directional image having a highest correlation with the first omni-directional image is captured, from a selection of at least three nodes at which a second omni-directional image having a high correlation with the first omni-directional image is captured;
    determining that the confirmed at least one node from the selection of at least three nodes has a correlation coefficient higher than a reference value; and
    determining that the moving robot is located at a first node when the moving robot reaches the first node, at which the second omni-directional image having a highest correlation with the first omni-directional image is captured, from selection of at least three nodes;
    wherein, determining whether the remaining nodes other than the first node from among the at least one node are effective or not, and moving the moving robot to move to a heading angle determined according to the number of effective nodes, so that the moving robot approaches the first node,
    wherein, the number of the at least one node is "3", the moving direction of the moving robot is set to the heading angle when the number of effective nodes is "0", the direction from the effective node to the first node is set to the heading angle direction when the number of effective nodes is "1", and the direction from a gravity center of a triangle composed of the first node and two effective nodes to the first node is set to the heading angle when the number of effective nodes is "2".

2. The method according to claim 1, further comprising:
    determining that the moving robot reaches the first node when a correlation coefficient between the second omni-directional image of the first node and the first captured omni-directional image is higher than a reference value.

3. The method according to claim 1, further comprising:
    determining that the moving robot reaches the first node when the current first node is not changed from a previous first node and the correlation coefficient between the second omni-directional image of the first node and the first captured omni-directional image gradually increases and then decreases.

4. The method according to claim 1, further comprising:
    moving the moving robot to continuously move to the first node when the correlation coefficient between the second omni-directional image of the first node and the first captured omni-directional image gradually increases and then does not decrease.

5. The method according to claim 4, further comprising:
    determining, by the moving robot, whether the remaining nodes other than the first node from among the at least one node are effective or not when the moving robot moves to the first node, wherein
    the moving direction of the moving robot is maintained when the number of effective nodes is set to "0", the moving robot moves from the effective node to the first node when the number of effective nodes is set to "1", and the moving robot moves from a gravity center of a triangle composed of the first node and two effective nodes to the first node when the number of effective nodes is set to "2".

6. The method according to claim 3, further comprising:
moving the moving robot to move to a new first node when the first node is changed from a previous first node.

7. The method according to claim 6, further comprising:
determining, by the moving robot, whether the remaining nodes other than the new first node from among the at least one node are effective or not when the moving robot moves to the new first node, wherein
the moving direction of the moving robot is maintained when the number of effective nodes is set to "0", the moving robot moves from the effective node to the new first node when the number of effective nodes is set to "1", and the moving robot moves from a gravity center of a triangle composed of the new first node and two effective nodes to the new first node when the number of effective nodes is set to "2".

8. The method according to claim 1, wherein each of the correlations is indicative of a correlation between current lines of two omni-directional images.

9. The method according to claim 1, wherein each of the correlations is represented by a correlation coefficient, and the correlation coefficient is calculated by the following equation:

$$\rho(\tau) = \frac{C_{xy}(\tau)}{\sqrt{C_{xx}(0) \cdot C_{yy}(0)}}$$ [Equation]

where $\rho(\tau)$ is indicative of a correlation coefficient, $\tau$ is indicative of a rotation angle, $C_{xy}$ is indicative of a cross-correlation value, and $C_{xx}$ and $C_{yy}$ are indicative of auto-correlation values.

10. The method according to claim 9, wherein the cross-correlation value is calculated by a Fast Fourier Transform (FFT).

11. A localization method of a moving robot, the method comprising:
capturing a first omni-directional image by the moving robot;
confirming at least one node at which a second omni-directional image having a highest correlation with the first omni-directional image is captured, from a selection of at least three nodes at which a second omni-directional image having a high correlation with the first omni-directional image is captured;
determining that the confirmed at least one node from the selection of at least three nodes has a correlation coefficient higher than a reference value; and
determining that the moving robot is located at a first node when the moving robot reaches the first node, at which the second omni-direction image having a highest correlation with the first captured omni-directional image is captured, and moving the moving robot to move to the first node when the moving robot does not reach the first node;
wherein, determining whether the remaining nodes other than the first node from among the at least one node are effective or not, and moving the moving robot to move to a heading angle determined according to the number of effective nodes, so that the moving robot approaches the first node,
wherein, the number of the at least one node is "3", the moving direction of the moving robot is set to the heading angle when the number of effective nodes is "0", the direction from the effective node to the first node is set to the heading angle direction when the number of effective nodes is "1", and the direction from a gravity center of a triangle composed of the first node and two effective nodes to the first node is set to the heading angle when the number of effective nodes is "2".

12. The method according to claim 11, wherein each of the correlations is indicative of a correlation between current lines of two omni-directional images.

13. The method according to claim 11, wherein each of the correlations is represented by a correlation coefficient, and the correlation coefficient is calculated by the following equation:

$$\rho(\tau) = \frac{C_{xy}(\tau)}{\sqrt{C_{xx}(0) \cdot C_{yy}(0)}}$$ [Equation]

where $\rho(\tau)$ is indicative of a correlation coefficient, $\tau$ is indicative of a rotation angle, $C_{xy}$ is indicative of a cross-correlation value, and $C_{xx}$ and $C_{yy}$ are indicative of auto-correlation values.

14. The method according to claim 13, wherein the cross-correlation value is calculated by a Fast Fourier Transform (FFT).

15. The method according to claim 11, wherein the nodes are determined to be effective when the remaining nodes other than the first node are within an effective range of the first node.

16. A moving robot, comprising:
an omni-directional camera capturing an omni-directional image by the moving robot;
a correlation coefficient calculator calculating a correlation coefficient between the captured omni-directional image and at least a second omni-directional image captured at least at one node location of a movable place of the moving robot, the at least one node location being the node location having the highest correlation coefficient from among a plurality of node locations; and
a controller moving the moving robot to a first node location when the correlation coefficient calculator calculates that the correlation coefficient is not greater than a reference value and the current first node location is not equal to a previous first node location and determining that the moving robot is at the first node location when the correlation coefficient is greater than the reference value,
wherein, determining whether the remaining nodes other than the first node from among the at least one node are effective or not, and moving the moving robot to move to a heading angle determined according to the number of effective nodes, so that the moving robot approaches the first node,
wherein, the number of the at least one node is "3", the moving direction of the moving robot is set to the heading angle when the number of effective nodes is "0", the direction from the effective node to the first node is set to the heading angle direction when the number of effective nodes is "1", and the direction from a gravity center of a triangle composed of the first node and two effective nodes to the first node is set to the heading angle when the number of effective nodes is "2".

17. The moving robot according to claim 16, wherein the controller moves the moving robot to the first node location when the current first node location is not equal to a previous first node location.

18. The moving robot according to claim 16, wherein the controller determines that the moving robot is at the first node location when the correlation coefficient is not greater than the reference value, the current first node location is equal to the previous first node location, and the correlation coefficient of the current first node location is less than a correlation coefficient of the previous first node location, the correlation coefficient of the previous first node location being greater than correlation coefficients of other first node locations prior to the previous first node location.

19. The moving robot according to claim 16, wherein the controller moves the moving robot to the first node location when the correlation coefficient is not greater than the reference value, the current first node location is equal to the previous first node location, and the correlation coefficient of the current first node location is not less than a correlation coefficient of the previous first node location.

\* \* \* \* \*